United States Patent
von Chappuis et al.

(10) Patent No.: US 11,565,546 B2
(45) Date of Patent: Jan. 31, 2023

(54) WHEEL ASSEMBLIES FOR MOTOR VEHICLES

(71) Applicant: Ford Global Technologies, LLC, Dearborn, MI (US)

(72) Inventors: Hubertus von Chappuis, Bedburg (DE); Michael Bartel, Cologne (DE); Przemyslaw Tomasz Chrost, Cologne (DE); Premkumar Rajamanickam, Munich (DE)

(73) Assignee: Ford Global Technologies, LLC, Dearborn, MI (US)

( * ) Notice: Subject to any disclaimer, the term of this patent is extended or adjusted under 35 U.S.C. 154(b) by 343 days.

(21) Appl. No.: 16/719,034

(22) Filed: Dec. 18, 2019

(65) Prior Publication Data

US 2020/0198393 A1 Jun. 25, 2020

(30) Foreign Application Priority Data

Dec. 19, 2018 (DE) .......................... 102018222261.4

(51) Int. Cl.
  *B60B 3/16* (2006.01)
  *B60B 27/00* (2006.01)
  *B60B 23/10* (2006.01)

(52) U.S. Cl.
  CPC ................ *B60B 3/16* (2013.01); *B60B 23/10* (2013.01); *B60B 27/0052* (2013.01)

(58) Field of Classification Search
  CPC ....... B60B 23/10; B60B 27/0052; B60B 3/14; B60B 3/16
  See application file for complete search history.

(56) References Cited

U.S. PATENT DOCUMENTS

| | | | | | |
|---|---|---|---|---|---|
| 1,939,641 | A | * | 12/1933 | Ash | ........................... B60B 3/16 |
| | | | | | 301/9.1 |
| 1,939,769 | A | * | 12/1933 | Eksergian | ................. B60B 3/16 |
| | | | | | 411/389 |
| 2,640,728 | A | * | 6/1953 | Slack | ........................ B60B 3/14 |
| | | | | | 29/273 |

(Continued)

FOREIGN PATENT DOCUMENTS

DE 19961710 2/2001
DE 102018004553 A1 * 11/2018 ......... B60B 27/0052

(Continued)

*Primary Examiner* — Jason R Bellinger
(74) *Attorney, Agent, or Firm* — Michael Hullmann; Hanley, Flight & Zimmerman LLC

(57) ABSTRACT

An example wheel assembly includes a wheel hub including a first bore having a first central axis, and a wheel including a second bore having a second central axis. The first central axis is offset from the second central axis. The example wheel assembly includes a wheel stud extending through the first bore and the second bore to couple the wheel and the wheel hub. The wheel stud has a first portion proximate to the first bore and a second portion proximate to the second bore. The example wheel assembly includes a wheel nut threaded onto the wheel stud. The first portion of the wheel stud is to move from a first position relative to an axis of rotation of the wheel hub to a second position relative to the axis of rotation when the wheel nut is tightened to fix the wheel to the wheel hub.

19 Claims, 2 Drawing Sheets

(56) References Cited

U.S. PATENT DOCUMENTS

| | | | | | |
|---|---|---|---|---|---|
| 2,640,729 | A | * | 6/1953 | Niven | ........................ B60B 3/14 |
| | | | | | D12/209 |
| 3,366,421 | A | * | 1/1968 | Bradley | .................... B60B 3/16 |
| | | | | | 301/35.622 |
| 5,884,980 | A | * | 3/1999 | Visser | ................. B60B 27/0068 |
| | | | | | 188/218 XL |
| 10,040,543 | B2 | * | 8/2018 | Enright | ............... F16D 65/0006 |
| 10,744,815 | B2 | * | 8/2020 | Nakagawa | ................ B60B 3/16 |

FOREIGN PATENT DOCUMENTS

| EP | | 0865939 | | 9/1998 | |
|---|---|---|---|---|---|
| EP | | 1010546 A2 | * | 6/2000 | ............... B60B 3/16 |

* cited by examiner

WHEEL ASSEMBLIES FOR MOTOR VEHICLES

RELATED APPLICATION

This patent claims priority to German Patent Application DE 102018222261.4, titled "Radanordnung" and filed Dec. 19, 2018, which is hereby incorporated by reference in its entirety.

FIELD OF DISCLOSURE

This disclosure relates generally to motor vehicles and, more particularly, to wheel assemblies for motor vehicles.

BACKGROUND

A motor vehicle such as a car or a truck includes a wheel assembly to rotatably couple a wheel of the motor vehicle to an axle of the motor vehicle.

SUMMARY

An example wheel assembly includes a wheel hub including a first bore, the first bore having a first central axis, and a wheel including a second bore, the second bore having a second central axis. The first central axis is offset from the second central axis. The example wheel assembly includes a wheel stud extending through the first bore and the second bore to couple the wheel and the wheel hub. The wheel stud has a first portion proximate to the first bore and a second portion proximate to the second bore. The example wheel assembly includes a wheel nut threaded onto the wheel stud. The first portion of the wheel stud is to move from a first position relative to an axis of rotation of the wheel hub to a second position relative to the axis of rotation of the wheel hub when the wheel nut is tightened to fix the wheel to the wheel hub.

An example apparatus includes a wheel hub defining a first opening therein, the first opening having a first central axis, and a wheel defining a second opening therein, the second opening having a second central axis. The first central axis is offset from the second central axis. The example apparatus includes a brake disc disposed between the wheel hub and the wheel. A base body of the brake disc defines a third opening therein. The example apparatus includes a wheel stud to extend through the first opening, the second opening, and the third opening. The wheel stud has a first portion proximate to the first opening and a second portion proximate to the second opening. The first portion of the wheel stud is to move from a first position relative to an axis of rotation of the wheel hub to a second position relative to the axis of rotation of the wheel hub when a wheel nut is tightened on the wheel stud.

An example wheel assembly includes a wheel hub defining a first opening therein, the first opening having a first central axis, and a wheel defining a second opening therein, the second opening having a second central axis. The first central axis is offset from the second central axis. The example wheel assembly includes a brake disc disposed between the wheel hub and the wheel. The brake disc defines a third opening therein. The brake disc includes a tapered end. The example wheel assembly includes a wheel fastener to extend through the first opening, the second opening, and the third opening to couple the wheel hub, the wheel, and the brake disc. A first side of the tapered end of the brake disc is to engage a surface of the wheel hub and a second side of the tapered end of the brake disc opposite the first side to engage a surface of the wheel when the wheel hub, the wheel, and the brake disc are coupled via the wheel fastener. The wheel fastener includes a first portion proximate to the first opening and a second portion proximate to the second opening. The first portion of the wheel fastener is to move from a first position relative to an axis of rotation of the wheel hub to a second position relative to the axis of rotation of the wheel hub when the wheel fastener is used to fix the wheel to the wheel hub.

Figure 1:
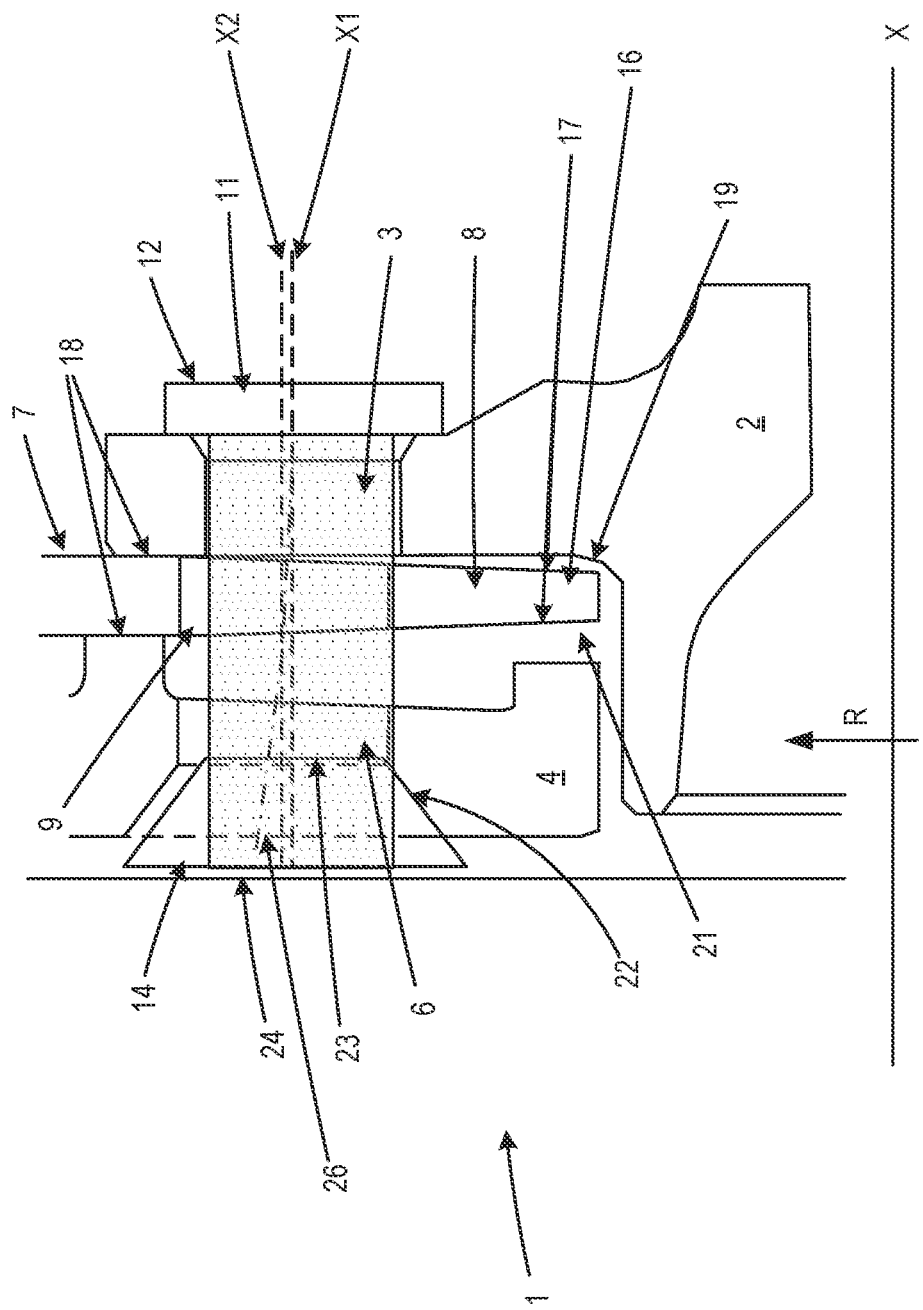
FIG. 1 illustrates an example wheel assembly in a pre-assembly state in accordance with the teachings of this disclosure.

The figures are not to scale. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

A motor vehicle such as a car or a truck includes a wheel coupled to a wheel hub of the motor vehicle using wheel bolts, wheel studs, and/or wheel nuts. The motor vehicle includes braking devices such as brake discs (e.g., brake rotors). In a first known wheel assembly, a base body of the braking device (i.e., the brake disc) is disposed between the wheel and the wheel hub. Wheel bolts fix the wheel on the wheel hub. Such wheel bolts include a threaded portion on a shaft of the bolt. These wheel bolts can be screwed from the wheel side in an axial direction into respective receiving bores (e.g., bores, openings, threaded bores, threaded openings, etc.) of the wheel hub. The receiving bores (e.g., bores, openings) of the wheel hub include internal threads to facilitate coupling of the wheel, the brake disc, and the wheel hub. A head side of each wheel bolt includes a spanner flat (e.g., a protrusion to engage a fastening tool, a hexed protrusion, etc.) adjoined by a conical contact surface. When the wheel bolts are in an installed state (i.e., the wheel bolts extend through openings or bores in the wheel, the brake disc, and the wheel hub), the conical contact surfaces of the wheel bolts are in bearing contact with respective hole edges of push-through openings of the wheel.

In a second known wheel assembly, wheel studs are guided from the wheel hub side of the wheel assembly by the receiving bores (e.g., bores, openings, etc.) of the wheel hub and the head side of the respective wheel studs are fixed in a rotationally secure manner, for example, via knurled or splined connections and/or interference fits with respective receiving bores. In such known wheel assemblies, threads are not included in the receiving bores or on the corresponding shaft portions of the wheel studs. Instead, a threaded portion of each wheel stud extends through and engages with through-bores (e.g., bores, openings, etc.) of the base body of the braking device (i.e., of the brake drum or disc), and the wheel. Each wheel stud projects beyond the base body and the wheel such that respective wheel nuts (e.g., lug nuts) can be screwed onto the wheel stud on the wheel side. Each wheel nut includes a spanner flat (e.g., a protrusion to engage a fastening tool, a hexed protrusion, etc.) adjoined by a conical contact surface. When the wheel nuts are in an installed state with the wheel studs, the wheel hub, the brake disc, and the wheel, the conical or spherical contact surfaces of the wheel nuts are in bearing contact with corresponding hole edges of the push-through openings (e.g., bores, openings, etc.) of the wheel.

Thus, in known wheel assemblies, a wheel is coupled to a corresponding wheel hub via wheel bolts, wheel studs and/or wheel nuts (e.g., lug nuts). In particular, the wheel bolts are screwed into respective receiving bores (e.g., bores, openings, etc.) of the wheel hub or, alternatively, the wheel nuts are screwed onto threaded portions of respective wheel studs. In known wheel assemblies, the wheel hub includes receiving bores (e.g., bores), the wheel includes corresponding push-through openings (e.g., bores, openings), and the base body of the braking device (e.g., the brake drum or disc) includes a corresponding number of through-bores (e.g., bores, openings, etc.). For instance, three to six wheel bolts and/or wheel studs are provided for each wheel of a motor vehicle to fix each wheel on a respective wheel hub, where a corresponding number of push-through openings, through-bores, receiving bores (which can include threaded bores), and/or wheel nuts are also provided on the wheel, the brake body, and the wheel hub.

In known wheel assemblies, tightening a wheel nut (as in the second known wheel assembly) and/or a wheel bolt (as in the first known wheel assembly) causes the wheel bolt to be centered (e.g., urged to the center of a respective push-through opening of a wheel) as a result of the tightening interface of the conical or spherical surface of the wheel nut (e.g., lug nut) and/or wheel bolt with the hole edge of the push-through opening (e.g., the bore, the opening, etc.) in the wheel. However, a life span of the wheel bolts can be reduced by dynamic loads on the wheel bolts during cornering of the vehicle.

In known wheel assemblies, when tightening the wheel bolt and/or the wheel nut (e.g., wheel nut), the shaft of the wheel bolt and/or wheel stud can buckle (e.g., be statically preloaded with bending loads). In particular, the shaft of the respective wheel bolt and/or wheel stud can buckle inward. For instance, the wheel bolts can deform in a quasi-circular-like manner (i.e., in a convex arc relative to an axis of rotation of the wheel hub). These static bending loads increase alternating bending stress amplitudes that occur during cornering and, as a result, have a negative effect on an endurance strength of the wheel bolts and/or wheel studs. Depending on the position of a wheel bolt and/or wheel stud during wheel rotation, the wheel bolt and/or wheel stud is either stretched or compressed at a respective maximum loading position. During rotation of the wheel, these dynamic loads occur in an alternating manner, wherein the maximum loading positions are above and below the axis of rotation of the wheel hub relative to a ground contact area of the wheel. In the intermediate positions, the loads on the wheel bolts and/or wheel studs are correspondingly reduced and/or increased. For instance, during rotation of the wheel, the compression loads decrease between the ground contact area of the wheel and the opposite maximum position, and the expansion loads increase. Conversely, expansion loads fall in the direction of the ground contact area of the wheel and the compression loads increase. This alternating loading of the individual wheel bolts and/or wheel studs is not conducive to endurance strength, and, thus, the wheel bolts and/or wheel studs must be correspondingly dimensioned to increase strength of the wheel bolts and/or wheel studs.

Examples disclosed herein provide for wheel assemblies including wheel bolts and/or wheel studs having increased durability and resistance as compared to wheel bolts and/or wheel studs in known wheel assemblies. Some examples disclosed herein provide for wheel bolts and/or wheel studs having reduced dimensions as compared to wheel bolts and/or wheel studs used in known wheel assemblies. Some examples disclosed herein provide for wheel assemblies having a reduced number of wheel bolts and/or wheel studs as compared to the number of wheel bolts and/or wheel studs in known wheel assemblies. Features and measures presented individually in the following description can be combined with one another in any technically feasible manner, giving rise to further examples.

Example wheel assemblies disclosed herein include a wheel hub rotatably mounted about an axis of rotation of the wheel hub and including at least one receiving bore (e.g., at least one bore, at least one opening, etc.). Example wheel assemblies disclosed herein include a wheel including at least one push-through opening (e.g., at least one bore, at least one opening, etc.) corresponding to the at least one receiving bore of the wheel hub, where the wheel is to be coupled to the wheel hub. In example wheel assemblies disclosed herein a braking device (i.e., a brake disc or brake drum) is disposed between the wheel hub and the wheel. In examples disclosed herein, a base body of the braking device includes at least one through-bore (e.g., at least one bore, at least one opening, etc.) corresponding to the at least one push-through opening of the wheel. At least one wheel bolt is provided to couple the wheel to the wheel hub.

In examples disclosed herein, the alternating bending stress amplitudes to which the wheel bolt(s) and/or wheel stud(s) are subject during cornering of the vehicle are reduced by axially offsetting the wheel bolt and/or wheel stud relative to the push-through opening in the wheel.

As a result of the offsetting of the wheel bolt and/or wheel stud relative to the push-through opening (e.g., bore, opening, etc.) in the wheel, damage to the wheel bolts and/or wheel studs caused during cornering of the vehicle is reduced, resulting in improved durability of the wheel bolts and/or wheel studs. To reduce the static bending loads on the wheel bolts and/or wheel studs as well as the alternating dynamic loading of the wheel bolts and/or wheel studs during cornering of a vehicle, the central axis of the receiving bore (e.g., bore, opening, etc.) of the wheel hub and the central axis of the push-through opening of the wheel are disposed parallel to one another and offset relative to one another in the radial direction relative to the axis of rotation of the wheel hub. In particular, the central axis of the receiving bore is offset in the radial direction from the central axis of the push-through opening relative to the axis of rotation of the wheel hub. In some examples, the receiving bore of the wheel hub is arranged with its central axis at all times below the central axis of the push-through opening of the wheel in relation to the axis of rotation of the wheel hub (e.g., the central axis of the receiving bore is arranged radially closer to the axis of rotation of the wheel hub than the push-through opening of the wheel).

In some examples disclosed herein, a wheel nut (e.g., a lug nut) is screwed onto a corresponding wheel stud. In such examples, the wheel stud includes an external threaded portion which interfaces with corresponding internal threads of the wheel nut. In such examples, the external threaded portion is positioned at a free end of the wheel bolt stud that projects beyond the push-through opening (e.g., bore, opening, etc.) of the wheel.

In some examples, the base body of the braking device (e.g., a brake disc) includes a conical taper at an end of the base body oriented in the direction of the axis of rotation of the wheel hub. When the example wheel assemblies disclosed herein are in a pre-assembly state with respect to the coupling of the wheel to the wheel hub, the conically tapered end of the base body includes radially inner contact surfaces that are spaced apart from the wheel hub and from the wheel. Thus, a first gap is defined between one of the radially inner contact surfaces of the base body and the wheel hub and a second gap is defined between the other radially inner contact surface of the base body and the wheel. In such examples, a portion of the base body of the brake disc opposite the conically tapered end in the radial direction bears against corresponding surfaces of the wheel hub and of the wheel.

In some examples, the wheel hub-side gap and the wheel-side gap have different magnitudes. In some examples, the wheel hub-side gap has a smaller magnitude than the wheel-side gap.

As used herein, example wheel assemblies are in a pre-assembly state when the wheel has been pushed onto the wheel bolts and/or wheel studs but the wheel bolts and/or wheel nuts (e.g., lug nuts) have not yet been fully tightened into respective receiving bores (e.g., bores, openings, etc.) or onto respective wheel bolts. Rather, the wheel nuts (e.g., lug nuts) are loosely screwed on the respective wheel studs or the wheel bolts are loosely screwed into respective receiving bores. As used herein, example wheel assemblies are in an assembled state when the wheel nuts are fully tightened on the respective wheel studs and/or the wheel bolts are tightened relative to threaded receiving bores. In the assembled state, the wheel is fastened to the wheel hub such that the wheel hub can be used during operation of the vehicle on a road. Also, in the assembled state, the base body of the brake disc bears with the conically tapered end (i.e., the end in the direction of the axis of rotation of the wheel hub), against the corresponding surfaces of the wheel hub and the wheel such that the two gaps discussed above are closed.

When example wheel assemblies disclosed herein are in the assembled state (i.e., when the wheel nuts and/or bolts are tightened), the conical design of the base body of the braking device provides for increased contact of the braking device with the wheel and the wheel hub between which the braking device is disposed. The increased contact between the braking device and the corresponding surfaces of the wheel and the wheel hub improves transmission of friction forces during braking maneuvers. The outer bearing of the wheel and the wheel hub on the base body of the braking device increases the contact pressure in the outer contact surface; as a result, a higher braking torque can be transmitted to the wheel during frictional contact. In other examples, the base body of the brake disc or the brake drum is a shape other than a conical shape. In some examples, the radially inner distance of the wheel to the base body and the radially inner distance of the wheel hub to the base body are configured such that the respective gaps defined between the base body and the wheel and the base body and the wheel hub have different magnitudes.

When example wheel assemblies disclosed herein are in the assembled state, respective ones of the wheel bolts and/or wheel studs are in a substantially convex configuration with respect to their central axes in relation to the axis of rotation of the wheel hub (i.e., the wheel bolts and/or wheel studs are pretensioned and arched to the outside of an axis of rotation of the wheel hub and/or statically preloaded). During cornering of the motor vehicle, the wheel bolts and/or wheel studs are exposed to a dynamic load, such as a fatigue load. During the rotation of the wheel hub, each wheel bolt and/or wheel stud is exposed in an alternating manner to extension and compression forces.

In examples disclosed herein, the central axis of the receiving bore of the wheel hub and the central axis of the push-through opening of the wheel are offset from one another in the radial direction. As a result, the effects of the static loading and the dynamic loading on the wheel bolts and/or wheel studs, i.e., fatigue, during cornering of the motor vehicle are substantially reduced or eliminated.

In some examples disclosed herein, a contact surface of a wheel nut (e.g., lug nut) that is screwed onto a free end of one of the wheel studs at least partially bears against a radially inner hole edge of the push-through opening (e.g., the bore, the opening, etc.) of the wheel. In these examples, the contact surface of the wheel nut is spaced apart from a radially outer hole edge of the push-through opening arranged diametrically opposite the radially inner hole edge. In the assembled state, bears with the contact surface of the wheel nut at least partially bears against the hole edge of the push-through opening. In this example, the wheel nut is arranged with inner and outer lateral walls of the wheel nut parallel to one another at an angle relative to the axis of rotation of the wheel hub.

In some examples disclosed herein, during tightening of the wheel nut (e.g., lug nut), at least a portion of the wheel stud moves relative to the axis of rotation of the wheel hub and, thus, the previously described convex curvature is counteracted. In these examples, the alternating loads on the wheel stud(s) are reduced during cornering of the vehicle because the wheel stud is not as convexly curved as the wheel stud would be without the offset of the central axes of receiving bore and push-through opening. In these examples, the central axis of the wheel stud may run in a substantially straight line (i.e., not curved). The substantially straight alignment of the central axis of the wheel stud can be achieved via the wheel nut. In particular, in the pre-assembly state, the wheel nut bears against the radially inner hole edge of the push-through opening of the wheel. In the assembled state, the wheel nut is inclined with respect to the inner lateral wall of the wheel nut in the direction of the axis of rotation of the wheel hub.

As a result of the offset of the central axes of the receiving bore (e.g., the first bore, the first opening, etc.) and push-through opening (e.g., the second bore, the second opening, etc.), the wheel bolt(s) and/or wheel studs of example wheel assemblies disclosed herein have improved durability, in particular, against fatigue loads. Thus, in example wheel assemblies disclosed herein, a thickness (e.g., diameter) of the wheel bolts and/or wheel studs can be reduced. As a result of the central axes of the receiving bore of the wheel hub and the push-through opening of the wheel being offset and the resulting improved durability of the wheel bolts and/or wheel studs, wheel bolts and/or wheel studs with material compositions having reduced mechanical strength can be used without adversely affecting the operation of the wheel assembly and safety of the vehicle. In some examples, a fewer number of wheel bolts and/or wheel studs can be used with example wheel assemblies disclosed herein as compared to known wheel assemblies. For example, four wheel bolts and/or wheel studs can be used instead of five wheel bolts and/or wheel studs. As a result of the reduction in the number of wheel bolts and/or wheel studs, the number of corresponding receiving bores, push-through openings, and through-bores of the wheel assembly can be reduced. As a result, production of example wheel assemblies disclosed herein is less complex and provides for cost-savings as compared to known wheel assemblies.

Turning to the figures, FIG. 1 illustrates an example wheel assembly 1 in accordance with teachings of this disclosure. In the example of FIG. 1, the wheel assembly 1 is in a pre-assembly state. The example wheel assembly 1 includes a wheel hub 2 rotatably mounted about an example axis of rotation X of the wheel hub 2. The wheel hub 2 includes at least one receiving bore 3 (e.g., at least one bore, at least one opening, etc.). The example wheel assembly 1 of FIG. 1 includes a wheel 4 including at least one push-through opening 6 (e.g., at least one bore, at least one opening, etc.) corresponding to the at least one receiving bore 3 of the wheel hub 2. In this example, the wheel assembly 1 includes a braking device implemented by an example brake disc 7 having a base body 8. In the example of FIG. 1, the brake disc 7 is disposed between the wheel hub 2 and the wheel 4. In this example, the base body 8 includes a through-bore 9 (e.g., a bore, an opening, etc.) corresponding to the push-through opening 6. The example wheel assembly 1 of FIG. 1 includes at least one wheel stud 11 to fix the wheel 4 on the wheel hub 2.

In the illustrated example of FIG. 1, the receiving bore 3 (e.g., the bore, the opening, etc.) of the wheel hub 2 has a first central axis X1 and the push-through opening 6 (e.g., the bore, the opening, etc.) of wheel 4 has a second central axis X2. As shown in FIG. 1, the first central axis X1 and the second central axis X2 are offset from one another in the radial direction in relation to the axis of rotation X of the wheel hub 2. In the example of FIG. 1, the central axis of the though-bore 9 of the brake disc 7 is not offset from the second central axis X2 of push-through opening 6 in the radial direction in relation to the axis of rotation X of the wheel hub 2.

In the illustrated example of FIG. 1, the first central axis X1 of the receiving bore 3 is offset from the second central axis X2 of the push-through opening 6 in the radial direction in relation to the axis of rotation X of the wheel hub 2 such that the first central axis X1 of the receiving bore 3 is arranged below the second central axis X2 of the push-through bore 6 (e.g., the first central axis X1 is radially closer to the axis of rotation X than the second central axis X2).

In the illustrated example of FIG. 1, the wheel stud 11 includes a bolt head 12 and a free end opposite the bold head 12. An external threaded portion, upon which an example wheel nut 14 (e.g., a lug nut) having a corresponding internal thread can be threaded is arranged on the free end of the wheel stud 11.

In the illustrated example of FIG. 1, the wheel stud 11 is disposed in the receiving bore 3 of the wheel hub 2 in a rotationally secure manner (e.g., a knurled connection, a splined connection, an interference fit, etc.). In this example, the free end of the wheel stud 11 projects beyond the push-through opening 6 of the wheel 4.

In the illustrated example of FIG. 1, the base body 8 of the brake disc 7 is conically tapered at an end 16 of the base body 8 positioned radially closest to the axis of rotation X of the wheel hub 2. In the example of FIG. 1, the cone angles (e.g., the angles of the taper) of the base body 8 on the wheel hub side and wheel side are different. The base body 8 of the brake disc 7 includes radially inner contact surfaces 17 defining a wheel hub-side gap 19 between one of the radially inner contact surfaces 17 and the wheel hub 2 and a wheel-side gap 21 between the other of the radially inner contact surfaces 17 and the wheel 4. In this example, the base body 8 of the brake disc 7 also includes radially outer contact surfaces 18 that bear against respective corresponding surfaces of the wheel 4 and on the wheel hub 2. In this example, the wheel hub-side gap 19 is smaller than the wheel-side gap 21 in terms of magnitude, as shown in FIG. 1.

In the pre-assembly state of the example wheel assembly 1 shown in FIG. 1, the wheel nut 14 is screwed onto the free end of the wheel stud 11 such that a conical contact surface 22 of the wheel nut 14 bears against a radially inner hole edge (e.g., radially closest to the axis of rotation X of the wheel hub 2) of the push-through opening 6. The contact surface 22 of the wheel nut 14 is spaced apart from a radially outer hole edge of the push-through opening 6, where the radially inner hole edge is diametrically opposite the radially outer hole edge of the push-through bore 6. In the pre-assembly state, an inner lateral surface 23 and an outer lateral surface 24 of the wheel nut 14 are disposed perpendicular to the axis of rotation X of the wheel hub 2. In the example of FIG. 1, the wheel nut 14 is therefore not inclined, as when the wheel assembly 1 is in the assembled state shown in FIG. 2.

Figure 2:
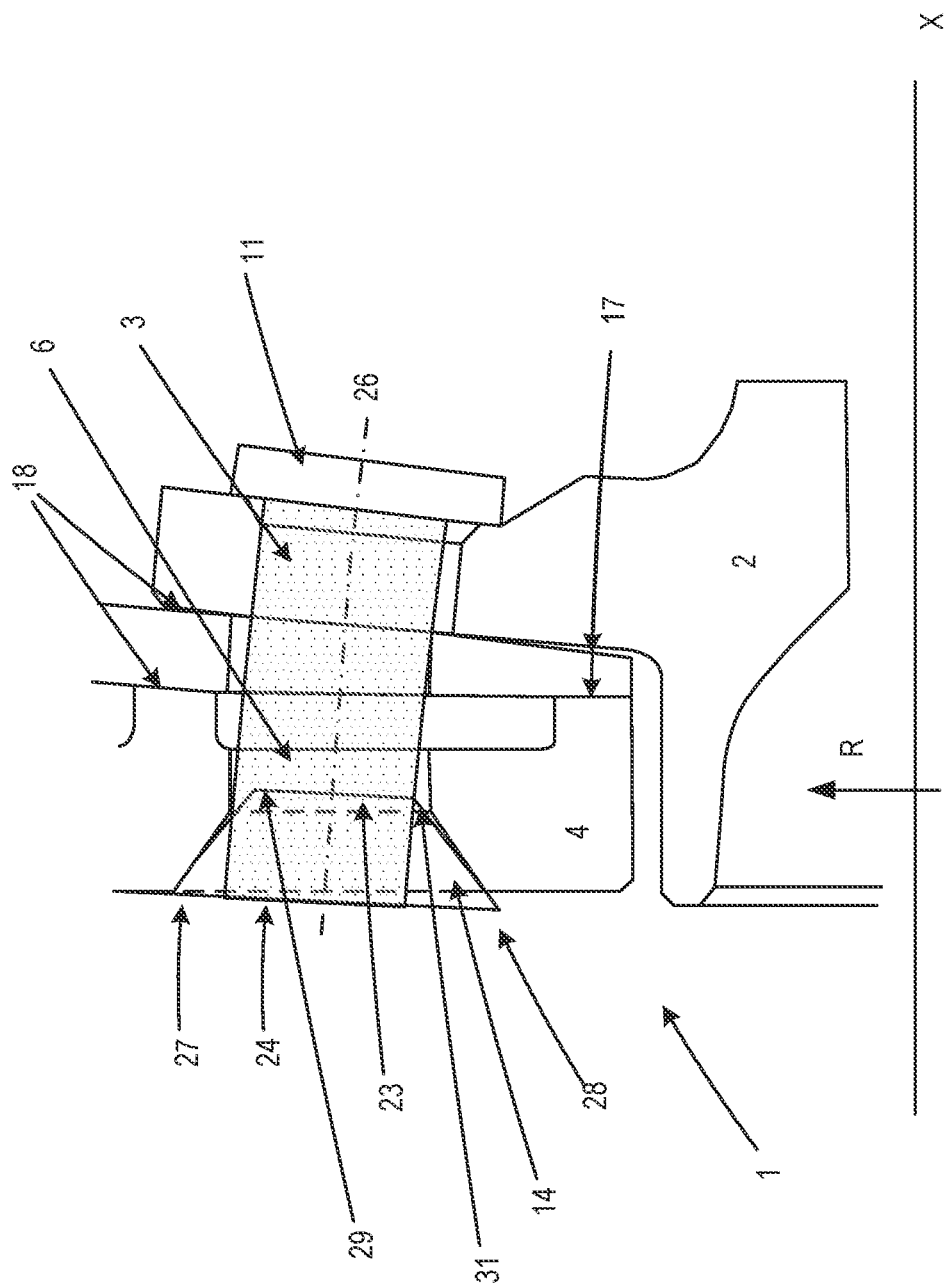
FIG. 2 illustrates the example wheel assembly of FIG. 1 in an assembled state.

FIG. 2 illustrates the example wheel arrangement FIG. 1 in an assembled state. In the example of FIG. 2, when the wheel nut 14 is tightened, the wheel stud 11 is oriented with its free end (e.g., the end interfacing the wheel nut 14) away from the axis of rotation X of the wheel hub 2 (i.e., bent upwards in the drawing plane). This orientation is represented by dashed line 26 in FIG. 2, which, in this example, corresponds to the central axis of the wheel stud 11 shown in the example of FIG. 1.

In the example of FIG. 2, when the wheel nut 14 is tightened, the wheel hub-side gap 19 and the wheel-side gap 21 are closed such that the radially inner contact surfaces 17 of the base body 8 of the brake disc 7 and the corresponding surfaces of the wheel hub 2 and the wheel 4 bear against one another in a gap-free manner. In the absence of the offset between the first central axis X1 of the receiving bore 3 of the wheel hub 2 and the second central axis X2 of the push-through opening 6 of the wheel 4, the wheel stud 11 would arch in relation to the axis of rotation X of the wheel hub 2 when the wheel nut 14 is tightened. However, because in the example wheel assembly 1 of FIGS. 1 and 2, the central axes X1, X2 are offset from one another in the radial direction (represented by arrow R in FIG. 2), the arising static bending load on the wheel stud 11 is substantially counteracted because the wheel stud 11 is bent with its free end to the outside (i.e., oriented away from axis of rotation X of wheel hub 2).

In the assembled state of the example wheel assembly 1 illustrated in FIG. 2, the wheel nut 14 is arranged with the inner and outer lateral surfaces 23, 24 of the wheel nut 14 inclined relative to the axis of rotation X of the wheel hub 2. In this example, the conical contact surface of the wheel nut 14 does not bear completely against the hole edge of the push-through opening 6, rather, only regions or portions thereof bear against the hole edge of the push-through opening 6. In this example, a first example region 27 of the outer lateral surface 24 of the wheel nut 14 is flush with the outer hole edge. A second example region 28 of the outer lateral surface 24, which is disposed closer to the axis of rotation X of the wheel hub 2 than the first example region 27 of the outer lateral surface 24, projects beyond the outer hole edge. In an analogous manner, a third example region 29 of the inner lateral surface 23 of the wheel nut 14 projects a greater distance from the hole edge than a fourth example region 31 of the wheel nut 14 that is disposed closer to the axis of rotation X of the wheel hub 2 than the third example region 29, of the inner lateral surface 23.

Thus, in the assembled state of the example wheel assembly 1 illustrated in FIG. 2, the central axis 26 of the wheel stud 11 is straight or substantially straight. In other examples, the central axis 26 of the wheel stud 11 is substantially curved. In the example of FIG. 2, the central axis 26 of the wheel stud 11 runs from bottom right to top left in relation to the axis of rotation X of wheel hub 2 in the drawing plane. It is to be understood that an opposite side (e.g., the diametrically opposite side) of the wheel hub 2 (not shown) is mirrored in relation to the axis of rotation X with respect to the side of the wheel hub 2 shown in FIG. 2. Further, other wheel studs 11 of the example wheel assembly 1 are arranged in an analogous manner with respective central axes of the wheel studs 11 relative to the axis of rotation X. For example, a number of receiving bores 3 (e.g., bores, openings, etc.) may be define a wheel hub bore circle and a number of push-through openings 6 (e.g., bores, openings, etc.) may define a wheel bore circle. In this example, the diameter of the wheel hub bore circle is smaller than the diameter of the wheel bore circle.

Example apparatus, systems, and articles for reducing or preventing oversteer are disclosed herein. Further examples and combinations thereof include the following:

Example 1 includes a wheel assembly including a wheel hub including a first bore, the first bore having a first central axis, and a wheel including a second bore, the second bore having a second central axis. The first central axis is offset from the second central axis. The example wheel assembly includes a wheel stud extending through the first bore and the second bore to couple the wheel and the wheel hub. The wheel stud has a first portion proximate to the first bore and a second portion proximate to the second bore. The example wheel assembly includes a wheel nut threaded onto the wheel stud. The first portion of the wheel stud is to move from a first position relative to an axis of rotation of the wheel hub to a second position relative to the axis of rotation of the wheel hub when the wheel nut is tightened to fix the wheel to the wheel hub.

Example 2 includes the wheel assembly of example 1, further including a brake disc disposed between the wheel hub and the wheel, the brake disc including a base body, the base body defining a third bore therein.

Example 3 includes the wheel assembly of example 2, wherein the third bore includes a third central axis, the third axis coincident with the second central axis.

Example 4 includes the wheel assembly of example 2, wherein the third bore includes a third central axis, the third axis coincident with the second central axis.

Example 5 includes the wheel assembly of example 4, wherein the tapered end is a conical tapered end.

Example 6 includes the wheel assembly of example 4, wherein a first side of the tapered end is to engage a surface of the wheel hub and a second side of the tapered end opposite the first side is to engage a surface of the wheel when the wheel nut is tightened.

Example 7 includes the wheel assembly of any of examples 1-6, wherein the first central axis is to be disposed a first distance from the axis of rotation of the wheel hub and the second central axis is to be disposed a second distance from the axis of rotation of the wheel hub, the first distance less than the second distance.

Example 8 includes the wheel assembly of example 7, further including a number of first bores disposed the first distance from the axis of rotation of the wheel hub to define a wheel hub bore circle and a number of second bores disposed the second distance from the axis of rotation of the wheel hub to define a wheel bore circle, the number of first bores equal to the number of second bores and the wheel hub bore circle having a diameter less than a diameter of the wheel bore circle.

Example 9 includes the wheel assembly of example 1, wherein the wheel nut includes a lateral face, the lateral face to be disposed at an angle relative to the axis of rotation of the wheel hub.

Example 10 includes an apparatus including a wheel hub defining a first opening therein, the first opening having a first central axis, and a wheel defining a second opening therein, the second opening having a second central axis. The first central axis is offset from the second central axis. The example apparatus includes a brake disc disposed between the wheel hub and the wheel. A base body of the brake disc defines a third opening therein. The example apparatus includes a wheel stud to extend through the first opening, the second opening, and the third opening. The wheel stud has a first portion proximate to the first opening and a second portion proximate to the second opening. The first portion of the wheel stud is to move from a first position relative to an axis of rotation of the wheel hub to a second position relative to the axis of rotation of the wheel hub when a wheel nut is tightened on the wheel stud.

Example 11 includes the apparatus of example 10, wherein the first central axis is disposed a first distance from an axis of rotation of the wheel hub and the second central axis is disposed a second distance from the axis of rotation, the first distance less than the second distance.

Example 12 includes the apparatus of examples 10 or 11, wherein the base body includes a tapered end.

Example 13 includes the apparatus of example 12, wherein a first portion of the tapered end is to engage a surface of the wheel hub and a second portion of the tapered end is to engage a surface of the wheel, the first portion opposite the second portion.

Example 14 includes the apparatus of any of examples 10-13, wherein the wheel stud includes a first end and a second end opposite the first end, and further including the wheel nut to be coupled to the second end of the wheel stud.

Example 15 includes the apparatus of example 14, wherein the wheel nut includes an inner lateral wall and an outer lateral wall, each of the inner lateral wall and the outer lateral wall to be disposed at an angle relative to an axis of rotation of the wheel hub.

Example 16 includes a wheel hub defining a first opening therein, the first opening having a first central axis, and a wheel defining a second opening therein, the second opening having a second central axis. The first central axis is offset from the second central axis. The example wheel assembly includes a brake disc disposed between the wheel hub and the wheel. The brake disc defines a third opening therein. The brake disc includes a tapered end. The example wheel assembly includes a wheel fastener to extend through the first opening, the second opening, and the third opening to couple the wheel hub, the wheel, and the brake disc. A first side of the tapered end of the brake disc is to engage a surface of the wheel hub and a second side of the tapered end of the brake disc opposite the first side to engage a surface of the wheel when the wheel hub, the wheel, and the brake disc are coupled via the wheel fastener. The wheel fastener includes a first portion proximate to the first opening and a second portion proximate to the second opening. The first portion of the wheel fastener is to move from a first position relative to an axis of rotation of the wheel hub to a second position relative to the axis of rotation of the wheel hub when the wheel fastener is used to fix the wheel to the wheel hub.

Example 17 includes the wheel assembly of example 16, wherein the first central axis is disposed a first distance from an axis of rotation of the wheel hub and the second central axis is disposed a second distance from the axis of rotation, the first distance less than the second distance.

Example 18 includes the wheel assembly of example 16, wherein the wheel fastener is a bolt having a conical taper.

Example 19 includes the wheel assembly of example 18, wherein at least a portion of the wheel fastener is disposed at an angle relative to an axis of rotation of the wheel hub.

Example 20 includes the wheel assembly of example 18, wherein a portion of the wheel fastener is to bear against the wheel adjacent the second opening.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. The following claims are hereby incorporated into this Detailed Description by this reference, with each claim standing on its own as a separate embodiment of the present disclosure.

What is claimed is:

1. A wheel assembly comprising:
   a wheel hub including a first bore, the first bore having a first central axis;
   a wheel including a second bore, the second bore having a second central axis, wherein the first central axis is offset from the second central axis;
   a wheel stud extending through the first bore and the second bore to couple the wheel and the wheel hub, the wheel stud having a first portion proximate to the first bore and a second portion proximate to the second bore; and
   a wheel nut threaded onto the wheel stud, the first portion of the wheel stud to move from a first position relative to an axis of rotation of the wheel hub to a second position relative to the axis of rotation of the wheel hub when the wheel nut is tightened to fix the wheel to the wheel hub.

2. The wheel assembly of claim 1, further including a brake disc disposed between the wheel hub and the wheel, the brake disc including a base body, the base body defining a third bore therein.

3. The wheel assembly of claim 2, wherein the third bore includes a third central axis, the third central axis coincident with the second central axis.

4. The wheel assembly of claim 2, wherein the base body includes a tapered end.

5. The wheel assembly of claim 4, wherein the tapered end is a conical tapered end.

6. The wheel assembly of claim 4, wherein a first side of the tapered end is to engage a surface of the wheel hub and a second side of the tapered end opposite the first side is to engage a surface of the wheel when the wheel nut is tightened.

7. The wheel assembly of claim 1, wherein the first central axis is to be disposed a first distance from the axis of rotation of the wheel hub and the second central axis is to be disposed a second distance from the axis of rotation of the wheel hub, the first distance less than the second distance.

8. The wheel assembly of claim 7, further including a number of first bores disposed the first distance from the axis of rotation of the wheel hub to define a wheel hub bore circle and a number of second bores disposed the second distance from the axis of rotation of the wheel hub to define a wheel bore circle, the number of first bores equal to the number of second bores and the wheel hub bore circle having a diameter less than a diameter of the wheel bore circle.

9. The wheel assembly of claim 1, wherein the wheel nut includes a lateral face, the lateral face to be disposed at an angle relative to the axis of rotation of the wheel hub.

10. An apparatus comprising:
    a wheel hub defining a first opening therein, the first opening having a first central axis;
    a wheel defining a second opening therein, the second opening having a second central axis, the first central axis offset from the second central axis;
    a brake disc disposed between the wheel hub and the wheel, a base body of the brake disc defining a third opening therein; and
    a wheel stud to extend through the first opening, the second opening, and the third opening, the wheel stud having a first portion proximate to the first opening and a second portion proximate to the second opening, the first portion of the wheel stud to move from a first position relative to an axis of rotation of the wheel hub to a second position relative to the axis of rotation of the wheel hub when a wheel nut is tightened on the wheel stud.

11. The apparatus of claim 10, wherein the first central axis is disposed a first distance from the axis of rotation of the wheel hub and the second central axis is disposed a second distance from the axis of rotation, the first distance less than the second distance.

12. The apparatus of claim 10, wherein the base body includes a tapered end.

13. The apparatus of claim 12, wherein a first portion of the tapered end is to engage a surface of the wheel hub and a second portion of the tapered end is to engage a surface of the wheel, the first portion opposite the second portion.

14. The apparatus of claim 10, wherein the wheel stud includes a first end and a second end opposite the first end, and further including the wheel nut to be coupled to the second end of the wheel stud.

15. The apparatus of claim 14, wherein the wheel nut includes an inner lateral wall and an outer lateral wall, each of the inner lateral wall and the outer lateral wall to be disposed at an angle relative to the axis of rotation of the wheel hub.

16. A wheel assembly comprising:
a wheel hub defining a first opening therein, the first opening having a first central axis;
a wheel defining a second opening therein, the second opening having a second central axis, the first central axis offset from the second central axis;
a brake disc disposed between the wheel hub and the wheel, the brake disc defining a third opening therein, the brake disc including a tapered end; and
a wheel fastener to extend through the first opening, the second opening, and the third opening to couple the wheel hub, the wheel, and the brake disc, a first side of the tapered end of the brake disc to engage a surface of the wheel hub and a second side of the tapered end of the brake disc opposite the first side to engage a surface of the wheel when the wheel hub, the wheel, and the brake disc are coupled by the wheel fastener, wherein the wheel fastener includes a first portion proximate to the first opening and a second portion proximate to the second opening, the first portion of the wheel fastener to move from a first position relative to an axis of rotation of the wheel hub to a second position relative to the axis of rotation of the wheel hub when the wheel fastener is used to fix the wheel to the wheel hub.

17. The wheel assembly of claim 16, wherein the first central axis is disposed a first distance from the axis of rotation of the wheel hub and the second central axis is disposed a second distance from the axis of rotation, the first distance less than the second distance.

18. The wheel assembly of claim 16, wherein at least a portion of the wheel fastener is disposed at an angle relative to the axis of rotation of the wheel hub.

19. The wheel assembly of claim 16, wherein a portion of the wheel fastener is to bear against the wheel adjacent the second opening.

* * * * *